(12) United States Patent
Jung et al.

(10) Patent No.: US 10,246,355 B2
(45) Date of Patent: Apr. 2, 2019

(54) AQUACULTURE SYSTEM

(71) Applicant: YUAN ZE UNIVERSITY, Taoyuan (TW)

(72) Inventors: Guo-Bin Jung, Taoyuan County (TW);
Chia-chen Yeh, Miaoli County (TW);
Jyun-Wei Yu, Taoyuan (TW);
Chia-Ching Ma, Taoyuan (TW);
Chung-Wei Hsieh, Tainan (TW);
Cheng-Lung Lin, Taichung (TW)

(73) Assignee: YUAN ZE UNIVERSITY, Taoyuan (TW)

( * ) Notice: Subject to any disclaimer, the term of this patent is extended or adjusted under 35 U.S.C. 154(b) by 236 days.

(21) Appl. No.: 15/259,624

(22) Filed: Sep. 8, 2016

(65) Prior Publication Data

US 2017/0362103 A1     Dec. 21, 2017

(30) Foreign Application Priority Data

Jun. 17, 2016   (TW) ............................. 105119123 A

(51) Int. Cl.
*A01K 61/00*     (2017.01)
*A01K 63/04*     (2006.01)
(Continued)

(52) U.S. Cl.
CPC ............ *C02F 1/4672* (2013.01); *A01K 61/00*
(2013.01); *C02F 1/4618* (2013.01); *C02F 1/78*
(2013.01);
(Continued)

(58) Field of Classification Search
CPC .... C02F 1/4672; C02F 1/008; C02F 1/46109;
C02F 2001/46133; C02F 2103/20;
(Continued)

(56) References Cited

U.S. PATENT DOCUMENTS 5,635,039 A * 6/1997 Cisar ...................... B01D 53/22
204/252
5,972,196 A * 10/1999 Murphy ................. B01D 53/22
204/157.15
(Continued)

FOREIGN PATENT DOCUMENTS

CN        203827887 U    9/2014
CN        105475220 A    4/2016
(Continued)

*Primary Examiner* — Joseph W Drodge
(74) *Attorney, Agent, or Firm* — Li & Cai Intellectual Property (USA) Office

(57) ABSTRACT

An aquaculture system is provided. The aquaculture system includes a cultivation pond, a water circulation unit, a water quality detector, and a water processing module. The cultivation pond for storing the cultivation water has a recirculation inlet and recirculation outlet. The water circulation unit is in fluid communication with the cultivation pond to allow the cultivation water in the cultivation pond to circulate through the water circulation unit. The water quality detector is used to detect the quality of the water to obtain water quality information. The water processing module includes an electrolytic gas generator and a control unit to improve the quality of water. The control unit receives the water quality information and adjusts the applied voltage on the electrolytic gas generator according to the water quality information to control the gas species and a ratio of the gases generated by the electrolytic gas generator.

16 Claims, 3 Drawing Sheets

(51) Int. Cl.
  *C02F 1/46* (2006.01)
  *C02F 1/467* (2006.01)
  *C02F 1/461* (2006.01)
  *C02F 1/78* (2006.01)
  *C02F 1/00* (2006.01)
  *C02F 103/20* (2006.01)
  *C02F 1/42* (2006.01)
  *C02F 1/70* (2006.01)

(52) U.S. Cl.
  CPC ............... *C02F 1/008* (2013.01); *C02F 1/42* (2013.01); *C02F 1/46109* (2013.01); *C02F 1/70* (2013.01); *C02F 2001/46133* (2013.01); *C02F 2001/46138* (2013.01); *C02F 2103/20* (2013.01); *C02F 2201/4616* (2013.01); *C02F 2201/46115* (2013.01); *C02F 2201/46135* (2013.01); *C02F 2209/006* (2013.01); *C02F 2209/02* (2013.01); *C02F 2209/04* (2013.01); *C02F 2209/05* (2013.01); *C02F 2209/06* (2013.01); *C02F 2209/10* (2013.01); *C02F 2209/14* (2013.01); *C02F 2209/22* (2013.01); *Y02A 40/81* (2018.01); *Y02E 60/366* (2013.01)

(58) Field of Classification Search
  CPC .. C02F 2201/46115; C02F 2201/46135; C02F 2209/10; C02F 2209/006; C02F 2209/02; C02F 2209/04; C02F 2209/05; C02F 2209/06; C02F 2209/14; C02F 2201/4616; C02F 1/46; C02F 1/461; C02F 1/46104; C02F 1/46157; C02F 1/46161; C02F 1/46166; A01K 61/00; A01K 61/10; A01K 63/003; A01K 63/006; A01K 63/04; A01K 63/042; A01K 63/045

USPC .... 210/96.1, 143, 150, 151, 167.21, 167.25, 210/167.3, 170.02, 748.01, 748.16, 210/748.17, 748.19; 119/226, 245, 259, 119/261, 263, 268; 205/628–639
  See application file for complete search history.

(56) References Cited

U.S. PATENT DOCUMENTS

| | | | | |
|---|---|---|---|---|
| 6,183,623 | B1* | 2/2001 | Cisar | B01D 53/22 204/252 |
| 9,315,398 | B2* | 4/2016 | Yazdanbod | C02F 1/4695 |
| 2008/0023397 | A1* | 1/2008 | Clifford | C02F 11/04 210/614 |
| 2010/0072144 | A1* | 3/2010 | Osakabe | C02F 1/70 210/752 |
| 2011/0024361 | A1* | 2/2011 | Schwartzel | C02F 1/325 210/739 |
| 2012/0132521 | A1* | 5/2012 | Silver | C02F 3/005 204/252 |
| 2013/0112601 | A1* | 5/2013 | Silver | C02F 3/025 210/143 |
| 2015/0305313 | A1* | 10/2015 | Licamele | A01K 63/04 119/204 |
| 2015/0342161 | A1* | 12/2015 | Sheriff | A01K 63/045 119/227 |
| 2018/0064071 | A1* | 3/2018 | Goldsborough | A01K 61/10 |

FOREIGN PATENT DOCUMENTS

TW         M431567 U1      6/2012
TW         201504476 A     2/2015

* cited by examiner

AQUACULTURE SYSTEM

BACKGROUND

1. Technical Field

The present disclosure relates to an aquaculture system, in particular, to an aquaculture system which employs water electrolytic technique using proton exchange membrane (PEM) to process water.

2. Description of Related Art

Aquaculture is one of the important economic industries in Taiwan, and has brought large revenue in the past 20 years. Aquaculture species comprise shrimp and aquaculture of economic fish such as groupers, mullets, milkfish and cobias.

During the culturing process, chemicals are used to control the culturing environment to inhibit the growth of the germs or bacteria and facilitate the growth of the living body. However, the regulations regarding the use of the chemicals is strict and limits the use of the chemicals. In addition, the chemicals may stay in the living body and affect human health.

Alternatively, regularly replacing a large amount of water can adjust the water quality and maintain the cultivation environment. However, although this means may eliminate the problem related to the chemical residues, the disadvantage thereof is the waste of water resources. Along with water resources management, there is a need to provide an inventive cultivation system to reduce the water consumption and create an ideal cultivation environment for aquaculture species.

SUMMARY

In order to achieve the above object, the instant disclosure provides an aquaculture system which employs proton exchange membrane (PEM) to electrolyze water for generating hydrogen gas and oxygen gas, generating hydrogen gas, oxygen gas and ozone to adjust the water quality of the cultivation water.

An embodiment of the present disclosure provides an aquaculture system, comprising a culture pond, a water circulation unit, a water quality detector and a water processing module. The culture pond stores cultivation water of a predetermined water level, in which the culture pond has a recirculation inlet and a recirculation outlet. The water circulation unit is arranged between the recirculation inlet and the recirculation outlet, the water circulation unit is in fluid communication with the recirculation inlet and the recirculation outlet, and the cultivation water is circulated by the water circulation unit. The water quality detector detects the water quality of the cultivation water for obtaining water quality information. The water processing module comprises an electrolytic gas generator and a control unit. The electrolytic gas generator is in fluid communication with the water circulation unit, in which the electrolytic gas generator has a first outlet tube for outputting a first gas to the water circulation unit, and a second outlet tube for outputting a second gas to the water circulation unit. The control unit is electrically connected to the electrolytic gas generator and the water quality detector, in which the control unit receives the water quality information, and adjusts a voltage value of the electrolytic gas generator based on the water quality information to control the type and ratio of gases generated by the electrolytic gas generator.

To sum up, the electrolytic gas generator of the aquaculture system provided by the instant disclosure can generate hydrogen gas, oxygen gas and ozone. By dissolving the above gases into the cultivation water, the cultivation environment is improved. In addition, the control unit can adjust the voltage value of the electrolytic gas generator based on the type of the aquaculture species, thereby changing the production amounts of each gas. Therefore, the cultivation water with the dissolved gases benefits the growth of the aquaculture species and can prevent disease.

In order to further understand the techniques, means and effects of the instant disclosure, the following detailed descriptions and appended drawings are hereby referred to, such that, and through which, the purposes, features and aspects of the instant disclosure can be thoroughly and concretely appreciated; however, the appended drawings are merely provided for reference and illustration, without any intention to be used for limiting the instant disclosure.

BRIEF DESCRIPTION OF THE DRAWINGS

The accompanying drawings are included to provide a further understanding of the instant disclosure, and are incorporated in and constitute a part of this specification. The drawings illustrate exemplary embodiments of the instant disclosure and, together with the description, serve to explain the principles of the instant disclosure.

DESCRIPTION OF THE EXEMPLARY EMBODIMENTS

Figure 1:
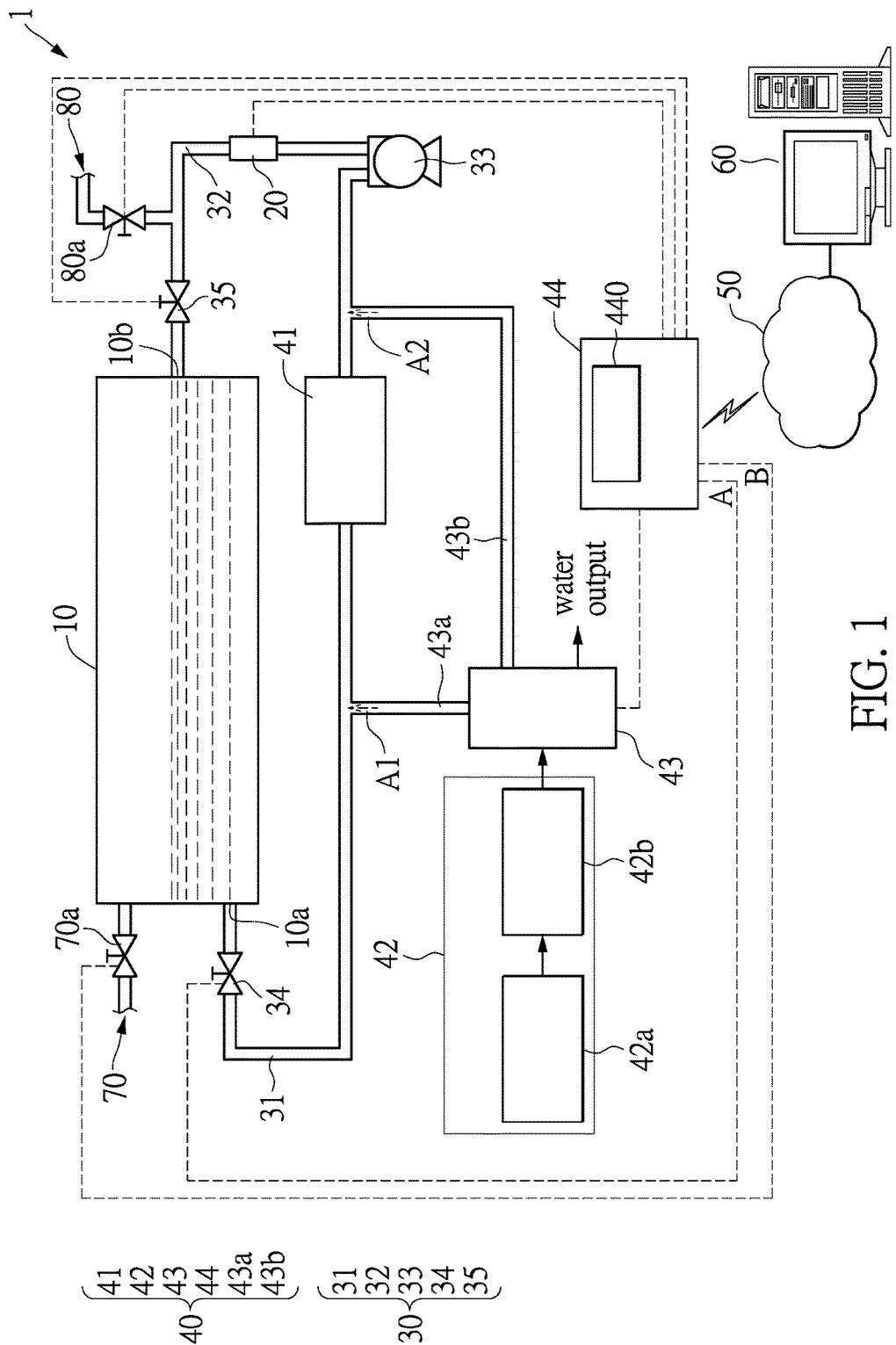
FIG. 1 is a function block diagram of the aquaculture system of the embodiments of the instant disclosure.

Reference will now be made in detail to the exemplary embodiments of the instant disclosure, examples of which are illustrated in the accompanying drawings. Wherever possible, the same reference numbers are used in the drawings and the description to refer to the same or like parts.

FIG. 1 shows a function block diagram of the aquaculture system of an embodiment of the instant disclosure. The aquaculture system 1 of the embodiments of the instant disclosure employs proton exchange membrane (PEM) electrolyze technique to generate hydrogen gas, oxygen gas or ozone for processing cultivation water, and is able to adjust the concentration of each gas in the cultivation water based on the type of the aquaculture species for providing suitable cultivation environments.

Specifically, the aquaculture system 1 comprises a culture pond 10, a water quality detector 20, a water circulation unit 30 and a water processing module 40. The culture pond 10 is communicated to the water processing module 40, and the water quality detector 20 is disposed in the culture pond 10 or in the piping of the water processing module 40.

The culture pond 10 stores cultivation water having a predetermined water level, and is used to culture creatures such as fish, shrimp or shellfish with economic value. The culture pond 10 has a recirculation outlet 10a and a recirculation inlet 10b.

The water circulation unit 30 is in fluid communication with the recirculation outlet 10a and the recirculation inlet 10b and is disposed between the recirculation outlet 10a and the recirculation inlet 10b for enabling the cultivation water to circulate. Specifically, the water circulation unit 30 comprises a water outlet pipeline 31, a water inlet pipeline 32 and a pump 33. The water outlet pipeline 31 is communicated to the recirculation outlet 10a, and the water inlet pipeline 32 is communicated to the recirculation inlet 10b. Cultivation water in the culture pond 10 is processed to improve water quality by passing through the water outlet pipeline 31, and flowing into the culture pond 10 through the water inlet pipeline 32. The pump 33 is disposed in the water inlet pipeline 32 for providing the power of circulation of the cultivation. The pump 33 is, for example, a Vortex pump.

In the embodiments of the instant disclosure, the water circulation unit 30 further comprises a first control valve 34 disposed on the water outlet pipeline 31, and a second control valve 35 disposed on the water inlet pipeline 32. The first control valve 34 is adjacent to the recirculation outlet 10a for controlling the amount of water output from the culture pond 10. The second control valve 35 is adjacent to the recirculation inlet 10b for controlling the amount of water flowing into the culture pond 10.

The water quality detector 20 is used to detect the water quality of the cultivation water for obtaining water quality information. In an embodiment, the water quality information comprises water temperature, redox-potential, pH value, dissolved oxygen, ammonia nitrogen, total dissolved solids and electro-conductivity. In the present embodiment, the water quality detector 20 is disposed in the water inlet pipeline 32 for detecting the water quality of the water flows into the culture pond 10. In another embodiment, the water quality detector 20 is disposed in the culture pond 10 for directly detecting the water quality of the water in the culture pond 10. In yet another embodiment, the water quality detector 20 is disposed in both the culture pond 10 and the water inlet pipeline 32 for detecting the water quality therein respectively.

Please refer to FIG. 1. The water processing module 40 comprises a filter unit 41, a pure water supply system 42, an electrolytic gas generator 43 and a control unit 44. The filter unit 41 and the electrolytic gas generator 43 both are in fluid communication with the water circulation unit 30 for processing the cultivation water flowing in the water circulation unit 30.

The electrolytic gas generator 43 electrolyzes water for generating a first gas A1 and a second gas A2. The pure water supply system 42 is communicated to the electrolytic gas generator 43 to supply water to the electrolytic gas generator 43. In the present embodiment, the pure water supply system 42 comprises a water supply system 42a and an ion exchange resin 42b, in which the water provided by the water supply system 42a passes through the ion exchange resin 42b for removing various cations and anions, and is provided to the electrolytic gas generator 43. In an embodiment, the water supply system 42a is a water storage tank or a water inlet tube.

The electrolytic gas generator 43 has a first outlet tube 43a and a second outlet tube 43b communicated to the water circulation unit 30 for outputting the first gas A1 and the second gas A2 respectively. In the present embodiment, the first outlet tube 43a is communicated to the water outlet pipeline 31 for outputting the first gas A1 before the cultivation water flows past the filter unit 41, thereby mixing the cultivation water and the first gas A1.

In the embodiments of the instant disclosure, the first gas A1 can be oxygen gas or a mixture comprising oxygen gas and ozone. The water temperature and the dissolved oxygen of the water would affect the food intake, culture efficiency, protein conversion efficiency and weight of the cultivation creature (such as fish). When the dissolved oxygen is relatively low, the food intake of the fish significantly decreases. In addition, when the water temperature is relatively high, the oxygen amount required by the fish increases and the dissolve oxygen in the water must be increased.

Therefore, the present embodiment, by providing oxygen gas based on the water temperature for adjusting the dissolved oxygen in water, is able to provide a suitable cultivation environment. Without the use of growth hormones, the instant disclosure can increase the final biomass of the aquaculture species and increase the feed efficiency ratio (FER).

In addition, ozone can be used to process water for improving the water quality, such as decreasing turbidity, decreasing the concentration of the nitrite and the total ammonia, reducing the total bacteria number, decreasing biological oxygen demand (BOD) and total suspended solids, decreasing the pathogenic germs in the fresh water and the sea water, and decreasing the odor in the water, etc. Ozone produces no harmful effect on the growth or incubation of the aquaculture creatures and hence, the harmful effect of the pathogenic germs on the incubation of the eggs can be reduced by introducing ozone at the start of the incubation. In some circumstances, the ozone can facilitate the wound healing and the tissue regeneration of the body of a fish. Therefore, by introducing ozone in the cultivation water, the water quality can be improved, the survival rate of the aquaculture species is increased and the use of chemicals can be eliminated, thereby preventing environmental pollution.

For example, in a shrimp cultivation process, a closed-type circulation water system is generally used to reduce the amount of the pathogenic germs for controlling the damage caused by shrimp diseases. The disinfectants, chlorine and formalin are added to inhibit the outbreak of disease. However, the above means induce the problem of chemical residue. Based on the experimental data, the disinfection efficiency toward *E. coli* of ozone is 600 to 3000 times faster than that of chlorine. In addition, ozone has significantly disinfection effect toward vibrio. Therefore, the use of ozone is able to decrease the incidence of disease of the aquaculture species.

In the embodiments of the instant disclosure, the second outlet tube 43b is communicated to the water inlet pipeline 32 for transporting the second gas A2 and enabling the cultivation water to mix with the second gas A2 before flowing back to the culture pond 10. In the embodiment of the instant disclosure, the second gas A2 is hydrogen gas. Under specific conditions, the hydrogen gas can facilitate the cure of cells and assist the heal of the creatures, thereby reducing the requirement of medicine and reducing the dose of chemicals that remain in the fish.

In the embodiments of the instant disclosure, the water processing module 40 comprises a first gas storing tank (not shown) communicating the first outlet tube 43a and the water outlet pipeline 31, and a second gas storing tank (not shown) communicating the second outlet tube 43b and the water inlet pipeline 32. The first gas storing tank and the second gas storing tank can be used to store the first gas A1 and the second gas A2 produced by the electrolytic gas generator 43 respectively.

Figure 2:
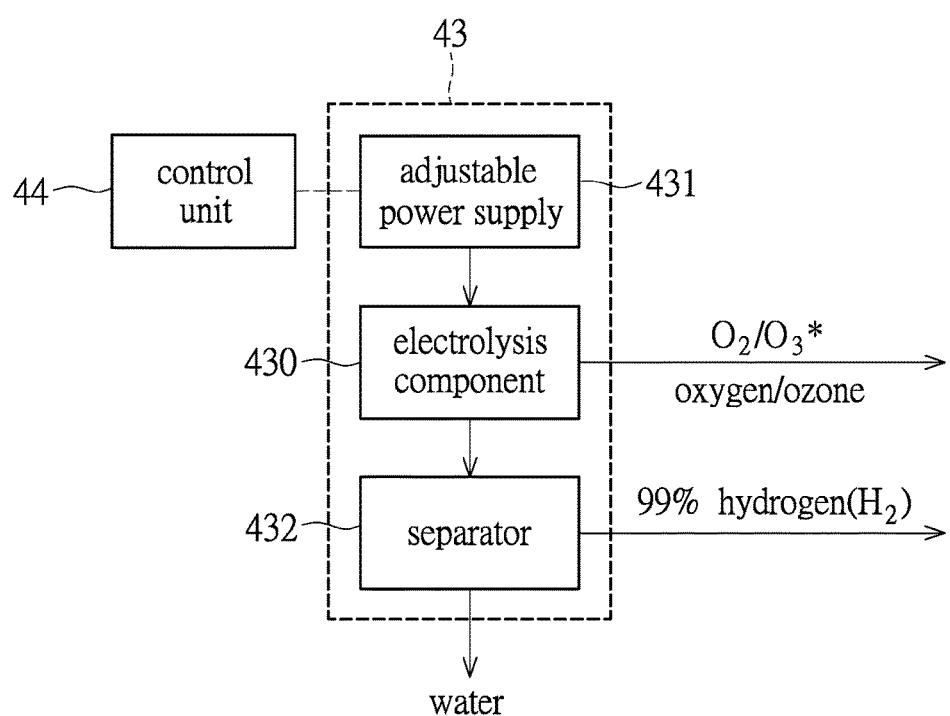
FIG. 2 is a function block diagram of the electrolytic gas generator of the embodiments of the instant disclosure.

The electrolytic gas generator 43 of the embodiments of the instant disclosure is a proton exchange membrane (PEM) electrolytic gas generator. Please refer to FIG. 2 and FIG. 3. FIG. 2 is a function block diagram of the electrolytic gas generator of the embodiments of the instant disclosure, and FIG. 3 is a schematic view of the water electrolyze component of the embodiments of the instant disclosure.

The electrolytic gas generator 43 of the embodiments of the instant disclosure comprises the water electrolysis component 430, the adjustable power supply 431 and the separator 432.

Figure 3:
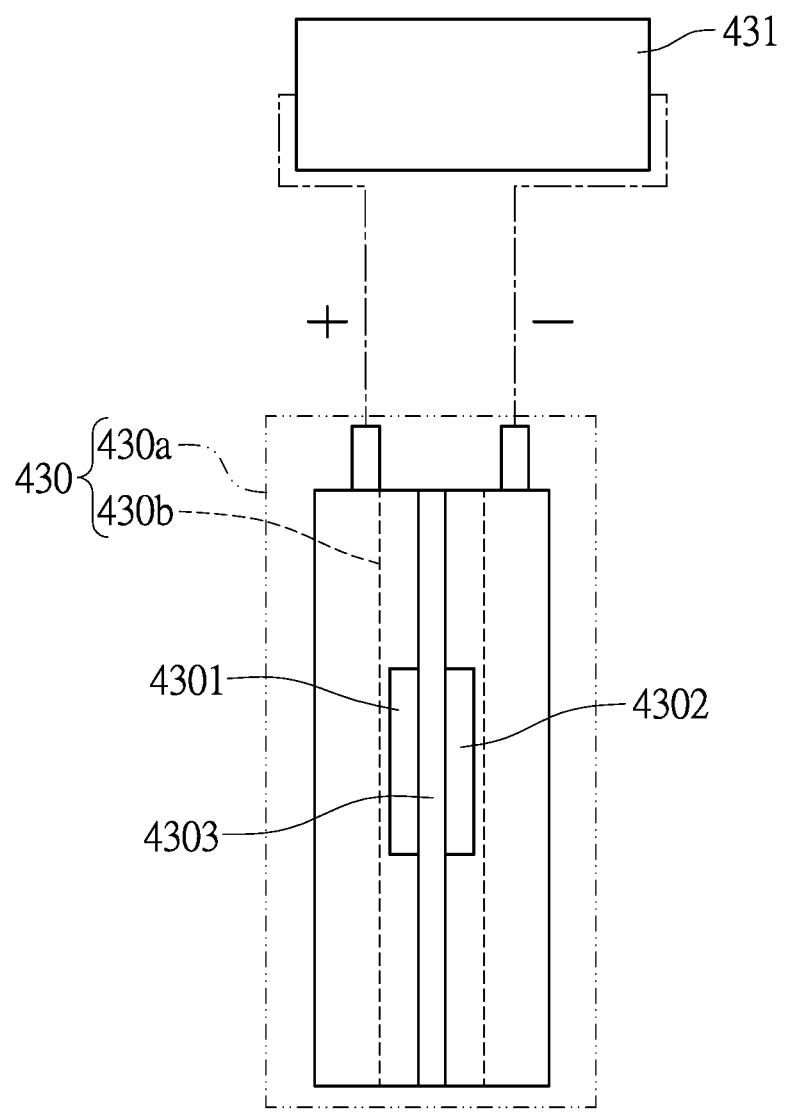
FIG. 3 is a schematic view of the water electrolysis component of the embodiments of the instant disclosure.

Please refer to FIG. 3, the water electrolysis component 430 comprises an electrolyzer 430a and a membrane electrode 430b disposed in the electrolyzer 430a, in which the electrolyzer 430a is in communication with the pure water supply system 42. The membrane electrode 430b comprises an anode 4301, a cathode 4302 and a proton exchange membrane 4303 disposed between the anode 4301 and the cathode 4302. In the present embodiment, the cathode 4302 is platinum (Pt)/carbon black coated on a carbon cloth. The material of the anode 4301 is related to the type of gas which is generated and is described later.

Please refer to FIG. 2 again. The adjustable power supply 431 is electrically connected to the water electrolysis component 430, i.e., is electrically connected to the anode 4301 and the cathode 4302 for constituting an electrical circuit. When the electrolysis process is performed, the adjustable power supply 431 provides a voltage value to the membrane electrode 430b for electrolyzing the water in the electrolyzer 430a and forming a first gas A1 and a second gas A2 at the anode 4301 and the cathode 4302 respectively. The second gas A2 is hydrogen.

The material constituting the anode 4301 comprises an additive and a composition, in which the composition comprises perfluorinated sulfonic acid resin (Nafion), polytetrafluoroethylene (PTFE), sulfuric acid ($H_2SO_4$), carbon nanotubes and graphene. The perfluorinated sulfonic acid resin can be used as an adhesive and the polytetrafluoroethylene can be used for reinforcing the catalytic layer structure. In addition, the sulfuric acid can increase the porosity in the catalytic layer for enabling the water molecules to enter. The carbon nanotubes and the graphene increase the conductivity of the catalytic layer.

The additive can be selected form the group consisting of iridium, iridium black, iridium oxide, ruthenium, ruthenium oxide, platinum, platinum iridium, palladium, iridium ruthenium oxide, iridium-ruthenium-tantalum oxide, nickel-tin-antimony alloy, lead dioxide, glassy carbon, boron doped diamond, platinum tantalum oxide and any combination thereof.

The additive of the anode 4301 and the voltage value applied to the membrane electrode 430b are selected based on the first gas to be generated. For example, when the first gas generated at the anode 4301 is oxygen gas, the voltage value is less than 1.5V and the additive of the anode 4301 is a catalyst that assists the generation of hydrogen gas and oxygen gas, such as iridium, iridium black, iridium oxide, ruthenium, ruthenium oxide, platinum, platinum iridium, palladium, iridium ruthenium oxide, iridium-ruthenium-tantalum oxide, and any combination thereof.

In another embodiment, when the gases generated at the anode 4301 comprise oxygen gas and ozone, the voltage value must be larger than 1.5V, and the additive of the anode 4301 is a catalyst that assists the generation of ozone such as tin-antimony-nickel alloy, lead dioxide, glassy carbon, boron doped diamond, platinum tantalum oxide and any combination thereof.

The first gas A1 and the second gas A2 generated at the anode 4301 and the cathode 4302 of the electrolytic gas generator 43 respectively enter the cultivation water flowing in the water circulation unit 30 through the first outlet tube 43a and the second outlet tube 43b respectively. After performing the electrolyzing process, the second gas (hydrogen gas) is mixed with water and has to be separated from the water by the separator 432, and the hydrogen isolated from water is output by the second outlet tube 43b.

Please refer to FIG. 1, in the embodiments of instant disclosure, the control unit 44 is electrically connected to the adjustable power supply 431 and the water quality detector 20. The control unit 44 receives the water quality information provided by the water quality detector 20, and controls the voltage value of the adjustable power supply 431 based on the water quality information for controlling the type of the first gas A1 output by the electrolytic gas generator 43.

In other words, by adjusting the voltage value of the electrolytic gas generator 43 by the control unit 44 and selecting the material of the anode 4301, the ratio of the oxygen gas and ozone in the first gas A1 generated by the anode 4301 can be adjusted. In addition, the concentration ratio of the oxygen gas and ozone is related to the voltage value. When the voltage value increases, the concentration of the ozone in the first gas A1 increases. Therefore, the control unit 44 can control the ratio of the concentrations of oxygen gas and ozone by controlling the voltage value.

In the embodiments of the instant disclosure, the control unit 44 further stores a reference table 440 for recording the ozone concentration, oxygen gas concentration and hydrogen gas concentration of different cultivation species. The control unit 44 adjusts the voltage value based on the water quality information, the cultivation species and the reference table 440 for adjusting the ozone concentration, the oxygen gas concentration and the hydrogen gas concentration of the cultivation water. Therefore, the control unit 44 can control the timing of inputting the hydrogen gas, the oxygen gas and ozone into the cultivation water based on the water quality information for maintaining the water quality.

In the present embodiment, the aquaculture system 1 further comprises a cloud host 50 connected to the control unit 44 and a remote monitoring device 60 connected to the cloud host 50. The control unit 44 uploads the received water quality information to the cloud host 50 for storage, and the remote monitoring device 60 can receive the water quality information through the cloud host 50.

In addition, the remote monitoring device 60 can be the user or the maintainer of the system and can monitor the operation of the aquaculture system 1 based on the water quality information stored in the cloud host 50. In addition, the user or the system maintainer can collect the water quality information in long-term by a remote monitoring device 60 to optimize the cultivation environment.

The control unit 44 can be electrically connected to the first control valve 34 and the second control valve 35. When the cultivation water in the culture pond 10 needs to be processed for increasing water quality, the control unit 44 controls the first control valve 34 and the second control valve 35 to open and enables the cultivation water to flow into the water circulation unit 30, and controls the adjustable power supply 431 to apply a voltage on the membrane electrode 430b for generating the first gas A1 and the second gas A2. When the control unit 44 judges that the water quality in the culture pond 10 satisfies the requirement of the cultivation species, the first control valve 34 and the second control valve 35 are closed.

In addition, in the embodiments of the instant disclosure, the aquaculture system 1 further comprises a water supplying port 70, a water inlet valve 70a disposed at the water supplying port 70, a water discharging port 80 and a water discharging valve 80a disposed at the water discharging port 80. The water supplying port 70 is in fluid communication with the culture pond 10 for providing additional water to the culture pond 10. The water discharging port 80 is in fluid communication with the water inlet pipeline 32 for discharging the cultivation waste water circulated for many times.

The water inlet valve 70a and the water discharging valve 80a are both electrically connected to the control unit 44 for controlling the flow of the water input and output. Specifically, when the cultivation water in the culture pond 10 is recycled for predetermined times and needs to be replaced, the control unit 44 controls the water inlet valve 70a, the first control valve 34 and the water discharging valve 80a to open and control the second control valve 35 to close. Therefore, the cultivation waste water in the culture pond 10 enters the water circulation unit 30 through the recirculation outlet 10a and passes through the water outlet pipeline 31, the filter unit 41 and the water inlet pipeline 32, then is discharged by the water supplying port 70.

The control unit 44 can control the adjustable power supply 431 to apply a voltage to the membrane electrode 430b to generate the first gas A1 and the second gas A2 entering the cultivation waste water to be discharged for performing preliminary sterilization and water quality processing. Therefore, the instant disclosure is able to prevent a large amount of cultivation waste water from producing serious pollution to the environment while being discharged.

In summary, the aquaculture system provided by the embodiments of the instant disclosure can recycle and reuse the cultivation water and extend the period of replacing a large amount of cultivation water. Therefore, the consumption of water resources is reduced.

The oxygen gas, ozone and hydrogen gas generated by the electrolytic gas generator can be used to process water for increasing water quality to reduce turbidity, the concentration of nitrite and total ammonia, the number of bacteria, the BOD, the total suspended solids (TSS), the pathogens in fresh water and sea water in the water, thereby optimizing the cultivation environment of the aquaculture species. In addition, before discharging the cultivation waste water, the oxygen gas, ozone and hydrogen gas generated by the electrolytic gas generator can be used to perform preliminary water processing to prevent the cultivation waste water from producing excessive pollution to the environment.

The aquaculture system of the embodiments of the instant disclosure is able to increase the growing yield and feed converting rate of the aquaculture species while reducing the use of growth hormone or other chemicals, thereby preventing the chemicals from remaining in the living body or in the cultivation waste water to contaminate the environment.

The above-mentioned descriptions represent merely the exemplary embodiment of the present disclosure, without any intention to limit the scope of the instant disclosure thereto. Various equivalent changes, alterations or modifications based on the claims of the instant disclosure are all consequently viewed as being embraced by the scope of the instant disclosure.

What is claimed is:

1. An aquaculture system, comprising:
   a culture pond for storing a cultivation water of a predetermined water level, wherein the culture pond has a recirculation inlet and a recirculation outlet;
   a water circulation unit arranged between the recirculation inlet and the recirculation outlet, the water circulation unit is in fluid communication with the recirculation inlet and the recirculation outlet, and the cultivation water is circulated by the water circulation unit;
   a water quality detector disposed in at least one of the culture pond and the water circulation unit for detecting the water quality of the cultivation water and obtaining a piece of water quality information; and
   a water processing module comprising:
      an electrolytic gas generator in fluid communication with the water circulation unit and for generating a first gas and a second gas by electrolyzing water, wherein the electrolytic gas generator has a first outlet tube and a second outlet tube independently in fluid communication with the water circulation unit for unidirectionally outputting the first gas and the second gas into the water circulation unit, respectively; and
      a control unit electrically connected to the electrolytic gas generator and the water quality detector, wherein the control unit receives the water quality information and controls the electrolytic gas generator to adjust a voltage value for electrolyzing water based on the water quality information to control a type of the first gas and a ratio of the first gas to the second gas generated by the electrolytic gas generator,
   wherein the cultivation water is circulated in the water circulation unit without flowing into the electrolytic gas generator.

2. The aquaculture system according to claim 1, wherein the water processing module comprises a filter unit connected to and in fluid communication with the water circulation unit, and the cultivation water flowing in the water circulation unit is filtered by the filter unit.

3. The aquaculture system according to claim 2, wherein the water circulation unit comprises a water inlet tube connected between the culture pond and the filter unit, a water outlet tube connected between the filter unit and the culture pond, and a pump, wherein the cultivation water flows out of the culture pond and enters the filter unit through the water outlet tube, flows out of the filter unit, and returns to the culture pond through the water inlet tube, and the pump is in fluid communication with the water inlet tube for providing a power for circulating the cultivation water in the water circulation unit.

4. The aquaculture system according to claim 3, wherein the first outlet tube is connected to and in fluid communication with the water outlet tube and inlets the first gas into the water outlet tube.

5. The aquaculture system according to claim 3, wherein the second outlet tube is connected to and in fluid communication with the water inlet tube and inlets the second gas into the water inlet tube.

6. The aquaculture system according to claim 3, wherein the water quality detector is disposed in the water inlet tube for detecting water quality of the cultivation water before the cultivation water flows into the culture pond.

7. The aquaculture system according to claim 3, further comprises a water supplying port and a water discharging port, the water supplying port is in fluid communication with the culture pond, and the water discharging port is in fluid communication with the water inlet tube for discharging a cultivation wastewater generated from the cultivation water being circulated in the aquaculture system for multiple times.

8. The aquaculture system according to claim 1, wherein when the voltage value for electrolyzing water is less than 1.5 V, the first gas is oxygen gas and the second gas is hydrogen gas.

9. The aquaculture system according to claim 1, wherein when the voltage value for electrolyzing water is larger than 1.5 V, the first gas comprises oxygen gas and ozone, and the second gas is hydrogen gas.

10. The aquaculture system according to claim 9, wherein the control unit accesses a reference table recording a superoxide concentration, an oxygen concentration and a hydrogen concentration corresponding to each of different culture species, and the control unit adjusts the voltage value according to the water quality information and the reference table for controlling the superoxide concentration, the oxygen concentration and the hydrogen concentration in the cultivation water.

11. The aquaculture system according to claim 1, wherein the water quality information comprises water temperature, redox-potential, pH value, dissolved oxygen, ammonia nitrogen, total dissolved solid and electro-conductivity.

12. The aquaculture system according to claim 1, further comprises a cloud host database connected to the control unit and a remote monitoring device connected to the cloud host database, wherein the control unit uploads and stores the water quality information to the cloud host database, and the remote monitoring device receives the water quality information from the cloud host database.

13. The aquaculture system according to claim 1, wherein the water processing module further comprises a pure water supplying device connected to and in fluid communication with the electrolytic gas generator for supplying water to the electrolytic gas generator.

14. The aquaculture system according to claim 1, wherein the electrolytic gas generator is a proton exchange membrane (PEM) electrolytic gas generator comprising:
a water electrolytic component comprising an electrolyzer and a membrane electrode set disposed in the electrolyzer, wherein the electrolyzer is in fluid communication with the pure water supplying device, the membrane electrode set comprises an anode, a cathode and a proton exchange membrane between the anode and the cathode; and
an adjustable power supply electrically connected to the anode and the cathode for forming an electric circuit, wherein the control unit is electrically connected to the adjustable power supply for adjusting a voltage value provided by the adjustable power supply.

15. The aquaculture system according to claim 14, wherein the anode comprises an additive and a composition, wherein the additive is selected from a group consisting of iridium, iridium black, iridium oxide, ruthenium, ruthenium oxide, platinum, platinum-iridium, palladium, iridium-ruthenium oxide, iridium-ruthenium-tantalum oxide, tin-antimony-nickel alloy, lead dioxide, glassy carbon, boron doped diamond, platinum-tantalum oxide and any combination thereof, and the composition comprises perfluorinated sulfonic acid resin, polytetrafluoroethylene, sulfuric acid, carbon nanotubes and graphene.

16. The aquaculture system according to claim 14, wherein the anode comprises an additive and a composition, wherein when the first gas comprises oxygen gas and ozone, the additive is tin-antimony-nickel alloy, lead dioxide, boron doped diamond, platinum-tantalum oxide or any combination thereof, the composition comprises perfluorinated sulfonic acid resin, polytetrafluoroethylene, sulfuric acid, carbon nanotubes or graphene, and the voltage value for electrolyzing water is larger than 1.5V.

* * * * *